United States Patent [19]

Norsworthy

[11] Patent Number: 4,760,398

[45] Date of Patent: Jul. 26, 1988

[54] METHODS AND APPARATUS FOR DETERMINING THE DIFFERENTIAL SIDEBAND POWER OF RADAR SIGNALS

[75] Inventor: Keith H. Norsworthy, Bellevue, Wash.

[73] Assignee: The Boeing Company, Del.

[21] Appl. No.: 307,163

[22] Filed: Sep. 30, 1981

[51] Int. Cl.⁴ .................. G01S 13/62; G01S 15/62
[52] U.S. Cl. ........................ 342/114; 342/115; 342/194; 342/160; 367/94
[58] Field of Search ............ 343/5 FT, 5 NQ, 7.7, 343/9 R, 8; 364/517, 487, 485; 375/15; 179/84 UF

[56] References Cited

U.S. PATENT DOCUMENTS

| | | | |
|---|---|---|---|
| Re. 30,288 | 5/1980 | Hackett | 343/5 PD |
| 3,281,842 | 10/1966 | Cesar et al. | 343/17.2 PC |
| 3,432,855 | 3/1969 | Kalmus | 343/7.7 |
| 3,665,443 | 5/1972 | Galvin | 340/258 |
| 3,706,989 | 12/1972 | Taylor, Jr. | 343/7 A |
| 3,760,400 | 9/1973 | Galvin et al. | 340/258 |
| 3,796,989 | 3/1974 | Ravas et al. | 343/5 NQ X |
| 3,846,778 | 11/1974 | Galvin et al. | 340/258 |
| 3,889,199 | 6/1975 | Gutleber | 343/17.2 PC X |
| 3,961,172 | 6/1976 | Hutcheon | 364/517 |
| 4,003,054 | 1/1977 | Goldstone | 343/17.7 |
| 4,083,049 | 4/1978 | Mattern et al. | 343/7.7 |
| 4,119,940 | 10/1978 | Keating et al. | 340/5 H |
| 4,132,990 | 1/1979 | Di Domizio et al. | 343/7 A |
| 4,137,533 | 1/1979 | Briechle et al. | 343/7.7 |
| 4,153,900 | 5/1979 | Novak et al. | 343/17.2 PC |
| 4,173,017 | 10/1979 | Burlage et al. | 343/5 NQ X |
| 4,222,050 | 9/1980 | Kiuchi et al. | 343/5 FT X |
| 4,225,864 | 9/1980 | Lillington . | |
| 4,292,635 | 9/1981 | Rittenbach | 343/5 NQ |
| 4,313,170 | 1/1982 | Lewis et al. | 343/17.2 PC X |
| 4,333,080 | 6/1982 | Collins et al. | 343/5 NQ X |

OTHER PUBLICATIONS

Haykin, "Performance Analysis of a Radar Signal Processing System with Continuous Electrical Array Scanning" *Inf. Sci.* 13:201-227 (1977), (excerpt only).

Colin et al., "Pulse Compression in Radars Using Binary Phase Modulation" Electrical Communication, vol. 52, No. 2 (1977) pp. 152-157.

Ackroyd et al., "Optimum Mismatched Filters for Sidelope Suppression" IEEE Trans. Aerospace and Elec. Systems, vol. AES-9, No. 2, Mar. 73.

*Primary Examiner*—T. H. Tubbesing
*Assistant Examiner*—Gilberto Barrón
*Attorney, Agent, or Firm*—Finnegan, Henderson Farabow, Garrett and Dunner

[57] ABSTRACT

A radar signal processor and methods of operating same for determining the differential sideband power of reflected energy received in a frequency window by a radar receiver, which processor contains a generator of orthogonal signals, a mixer for multiplying these orthogonal signals times quadrature signals, an integrating circuit for integrating the mixer outputs over a predetermined time interval, a multiplier for multiplying the integrals from the integrating circuit together, and a circuit to average the products from the multiplier over time.

15 Claims, 6 Drawing Sheets

| 1 | 2 | 3 | 4 * | 5 * | 6 | 7 |
|---|---|---|---|---|---|---|
| 0 | 0 | 1 | X1 | - | 1 | - |
| 1 | 0 | 1 | Y1 | - | 2 | - |
| 2 | 0 | 1 | - | X5 | 3 | - |
| 3 | 0 | 1 | - | Y5 | 4 | - |
| 4 | 0 | 2 | X1 | - | 5 | - |
| 5 | 0 | 2 | Y1 | - | 6 | - |
| 6 | 0 | 2 | - | X5 | 7 | - |
| 7 | 0 | 2 | - | Y5 | 8 | - |
| 8 | 8 | 1 | X2 | - | 1 | - |
| 9 | 8 | 1 | Y2 | - | 2 | - |
| 10 | 8 | 1 | - | X7 | 3 | 1,2+ |
| 11 | 8 | 1 | - | Y7 | 4 | 1,2- |
| 12 | 8 | 2 | X2 | - | 5 | - |
| 13 | 8 | 2 | Y2 | - | 6 | - |
| 14 | 8 | 2 | - | X7 | 7 | 2,2+ |
| 15 | 8 | 2 | - | Y7 | 8 | 2,2- |
| 16 | 16 | 1 | X3 | - | 1 | - |
| 17 | 16 | 1 | Y3 | - | 2 | - |
| 18 | 16 | 1 | - | X1 | 3 | - |
| 19 | 16 | 1 | - | Y1 | 4 | - |
| 20 | 16 | 2 | X3 | - | 5 | - |
| 21 | 16 | 2 | Y3 | - | 6 | - |
| 22 | 16 | 2 | - | X1 | 7 | - |
| 23 | 16 | 2 | - | Y1 | 8 | - |
| 24 | 24 | 1 | X4 | - | 1 | - |
| 25 | 24 | 1 | Y4 | - | 2 | - |
| 26 | 24 | 1 | - | X3 | 3 | - |
| 27 | 24 | 1 | - | Y3 | 4 | - |
| 28 | 24 | 2 | X4 | - | 5 | - |
| 29 | 24 | 2 | Y4 | - | 6 | - |
| 30 | 24 | 2 | - | X3 | 7 | - |
| 31 | 24 | 2 | - | Y3 | 8 | - |
| 32 | 32 | 1 | X5 | - | 1 | - |
| 33 | 32 | 1 | Y5 | - | 2 | - |
| 34 | 32 | 1 | - | X5 | 3 | - |
| 35 | 32 | 1 | - | Y5 | 4 | - |
| 36 | 32 | 2 | X5 | - | 5 | - |
| 37 | 32 | 2 | Y5 | - | 6 | - |
| 38 | 32 | 2 | - | X5 | 7 | - |
| 39 | 32 | 2 | - | Y5 | 8 | - |
| 40 | 40 | 1 | X6 | - | 1 | - |
| 41 | 40 | 1 | Y6 | - | 2 | - |
| 42 | 40 | 1 | - | X7 | 3 | 1,2+ |
| 43 | 40 | 1 | - | Y7 | 4 | 1,2- |
| 44 | 40 | 2 | X6 | - | 5 | - |
| 45 | 40 | 2 | Y6 | - | 6 | - |
| 46 | 40 | 2 | - | X7 | 7 | 2,2+ |
| 47 | 40 | 2 | - | Y7 | 8 | 2,2- |
| 48 | 48 | 1 | X7 | - | 1 | - |
| 49 | 48 | 1 | Y7 | - | 2 | - |
| 50 | 48 | 1 | - | X1 | 3 | - |
| 51 | 48 | 1 | - | Y1 | 4 | - |
| 52 | 48 | 2 | X7 | - | 5 | - |
| 53 | 48 | 2 | Y7 | - | 6 | - |
| 54 | 48 | 2 | - | X1 | 7 | - |
| 55 | 48 | 2 | - | Y1 | 8 | - |
| 56 | 56 | 1 | X8 | - | 1 | 1,1+ |
| 57 | 56 | 1 | Y8 | - | 2 | 1,1- |
| 58 | 56 | 1 | - | X3 | 3 | - |
| 59 | 56 | 1 | - | Y3 | 4 | - |
| 60 | 56 | 2 | X8 | - | 5 | 2,1+ |
| 61 | 56 | 2 | Y8 | - | 6 | 2,1- |
| 62 | 56 | 2 | - | X3 | 7 | - |
| 63 | 56 | 2 | - | Y3 | 8 | - |

* X1-X8 AND Y1-Y8 REPRESENT $X(T_1)$-$X(T_8)$ AND $Y(T_1)$-$Y(T_8)$, RESPECTIVELY

METHODS AND APPARATUS FOR DETERMINING THE DIFFERENTIAL SIDEBAND POWER OF RADAR SIGNALS

BACKGROUND OF THE INVENTION

The present invention relates to the field of radar signal processing and, more particularly, to the detection of non-oscillatory motion of objects by measuring the differential sideband power of energy, either acoustical or electromagnetic, received by radar systems.

Energy received by radar receivers contains unwanted signals called "clutter" or "clutter noise" from objects that appear to oscillate either because of their movement or movement of the radar receiver. Signal processing systems connected to radar receivers are designed to reduce such clutter. The simplest method of radar signal processing involves double sideband mixing which uses coherent baseband mixing and low pass filtering to reject components of clutter. This type of radar signal processing, however, yields an ambiguous result because it does not indicate whether the target being tracked is moving toward or away from the radar.

To avoid an ambiguous output, many radar systems instead use single sideband mixing in which two quadrature channels from the radar are mixed to produce signals corresponding to either positive or negative Doppler frequencies. The polarity of the Doppler frequency indicates whether the target being tracked is approaching or retreating from the radar.

A single sideband mixing system, however, is not as effective at eliminating clutter noise as is differential sideband mixing. Differential mixing takes advantage of the fact that the frequency of the Doppler energy from a continuously moving target is either above or below the transmitter frequency. Clutter energy, on the other hand, is approximately equally distributed on both sides of the transmitted signal's frequency.

Figure 1:
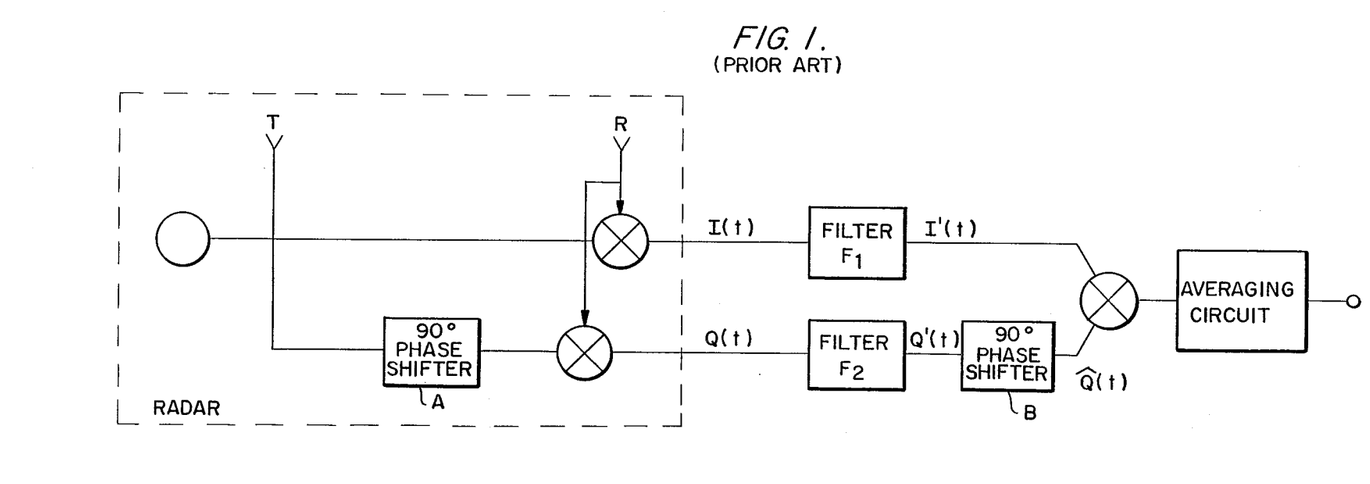
FIG. 1 depicts a prior art system for measuring the differential sideband power of energy received by a radar receiver.

One differential sideband radar system, is described in U.S. Pat. No. 3,432,855 to Kalmus and is represented in FIG. 1. The radar in that system produces two baseband quadrature signals, $I(t)$ and $Q(t)$ with $Q(t)$ shifted 90° from $I(t)$ by phase-shift circuit (A). $I(t)$ and $Q(t)$ are bandpass filtered by filters $F_1$ and $F_2$ to become $I'(t)$ and $Q'(t)$, respectively. The $Q'(t)$ signal is then phase-shifted 90° a second time by phase-shift circuit (B) to yield $\hat{Q}(t)$ which is multiplied by $I'(t)$. The average of that product is a differential sideband power measurement.

One disadvantage of this system is the difficulty in fabricating the second 90° phase-shift circuit (B) in FIG. 1. Unlike phase-shift circuit (A), which is also a 90° phase-shift circuit, phase-shift circuit (B) must shift signals whose bandwidth is large compared to the center frequency of circuit (B).

Another disadvantage of the system in Kalmus is that additional filters similar to F1 and F2 are required to measure the power in different frequency windows. This makes the entire system complex.

It is an object of the present invention to simplify the radar signal processors used to measure differential sideband power in order to detect non-oscillatory movement of objects by eliminating some of the complex circuitry in such systems and by reducing the number of elements needed to provide accurate radar signal processing.

It is also an object of the present invention to simplify the design of radar signal processors by taking advantage of certain relationships between the frequency windows in which the differential power is being measured.

Additional objects and advantages of the present invention will be set forth in part in the description which follows and in part will be obvious from that description or may be learned by practice of the invention. The objects and advantages of the invention may be realized and obtained by the methods and apparatus particularly pointed out in the appended claims.

SUMMARY OF THE INVENTION

The present invention overcomes the problems of the prior art and achieves the objects listed above by mixing selected orthogonal signals with quadrature signals from the radar, then integrating the mixed signals, and finally time-averaging the products of the integrals.

To achieve the objects and in accordance with the purpose of the invention, as embodied and as broadly described herein, the method of this invention of determining the differential sideband power of energy received in a desired frequency window by a radar system comprises the steps of: transmitting energy; receiving reflections of the transmitted energy; heterodyning a sample of the transmitted energy and the received reflections to produce first and second quadrature signals; generating first and second orthogonal signals; integrating the product of said first quadrature signal and said first orthogonal signal over a predetermined time interval to produce a first integral signal; integrating the product of a second quadrature signal and the second orthogonal signal over the predetermined time interval to produce a second integral signal; and time-averaging the product of the first and second integral signals to determine the differential sideband power in the desired frequency window.

The radar signal processor of this invention for determining the differential sideband power in a frequency window of energy received by a radar system producing first and second quadrature signals at least in part from said received energy comprises: means for generating first and second orthogonal signals; signal mixing means for forming a first mixed signal representing the product of the first quadrature signal and the first orthogonal signal and for forming a second mixed signal representing the product of the second quadrature signal and the second orthogonal signal; means connected to the signal mixing means for integrating the first mixed signal over a predetermined time interval to form a first integral signal and for integrating the second mixed signal over the predetermined time interval to form a second integral signal; and means for time-averaging the product of the first and second integral signals to determine the differential sideband power of the radar in the frequency window.

Preferably, the radar signal processing system of the present invention for determining the differential sideband power in a frequency window of a signal received by a radar system which system producing first and second quadrature signals at least in part from said received signal comprises: means for generating first and second orthogonal signals, $$X = W(t - T_K) \sin(2\pi f(t - T_K))$$

and $$Y = W(t - T_K) \cos(2\pi f(t - T_K)),$$

respectively where f is the center frequency of said frequency window, $T_K$ is an arbitrary starting time, and $W(t-T_K)$ is a weighting function controlling the shape of the frequency window;

signal mixing means for forming a first mixed signal representing the product of the first quadrature signal and first the orthogonal signal and for forming a second mixed signal representing the product of the second quadrature signal and the second orthogonal signal; means connected to the signal mixing means for integrating the first mixed signal over a predetermined time interval to form a first integral signal and for integrating the second mixed signal over the predetermined time interval to form a second integral signal; and means for time-averaging the product of the first and second integral signals to determine the differential sideband power of the radar in the frequency window.

The accompanying drawings, which are incorporated in and which constitute a part of this specification, illustrate one embodiment of the invention and, together with the description, explain the principles of the invention.

DESCRIPTION OF THE PREFERRED EMBODIMENT

Reference will now be made in detail to a presently preferred embodiment of the invention, an example of which is illustrated in the accompanying drawings.

Figure 2:
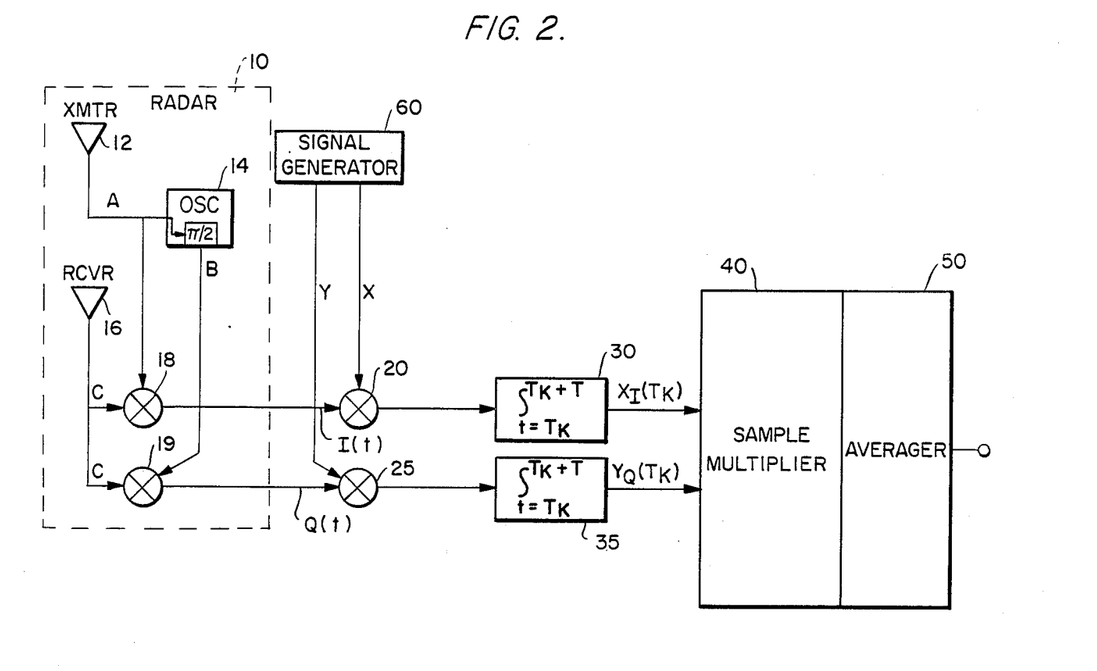
FIG. 2 shows one embodiment of the radar signal processor of this invention.

FIG. 2 shows a signal processing system for measuring the differential sideband power of a predetermined frequency window. In FIG. 2, radar system 10 contains an oscillator 14 which drives transmitter 12 by a signal A, causing transmitter 12 to transmit energy. Receiver 16 receives the reflections of the transmitted energy and forms received signal C.

Signal mixer 18 heterodynes signal A from oscillator 14 with received signal C to form quadrature signal I(t). Signal mixer 19 forms the other quadrature signal, Q(t), by mixing received signal C with signal B from oscillator 14. Signal B is signal A phase-shifted by 90°.

The process just described produces baseband I(t) and Q(t) signals. If the received signal C were heterodyned with other signals, it could still produce quadrature signals I(t) and Q(t), but they would not be baseband. In practice, the non-baseband signals may compensate for the velocity of the radar if it is mounted on a missile or some other moving platform.

A preferred example of the signal processing system of this invention includes means for generating first and second orthogonal signals $$X = W(t-T_K) \sin(2\pi f(t-T_K))$$

and $$Y = W(t-T_K) \cos(2\pi f(t-T_K)),$$

respectively where f is the center frequency of the frequency window in which the differential sideband power is being measured, $T_K$ is an arbitrary starting time, and $W(t-T_K)$ is a weighting function controlling the shape of the frequency window.

Persons of ordinary skill in the art will understand that the center frequency f may not fall exactly in the center of the frequency window if that window is asymmetrical. The term center frequency in the description and claims of this application therefore refers to the approximate center frequency of a window.

As stated above, the weighting function $W(t-T_K)$ determines the shape of the frequency window in which the differential sideband power is being measured. Common weighting functions are Hamming or Hanning functions which are well-known in the radar signal processing art and which are widely used in radar signal processors employing Fast Fourier Transformers. $W(t-T_K)$ could also have a constant value, in which case the frequency window in which differential sideband power is measured is a $\sin(X)/X$ window.

As shown in FIG. 2, this means for generating two orthogonal signals may be represented by signal generator 60. Signal generator 60 could be any standard waveform generator which can be triggered by an external signal.

In accordance with the present invention, a signal mixing means forms a first mixed signal representing a product of the first quadrature signal, either I(t) or Q(t), and the first orthogonal signal, either X or Y, and forms a second mixed signal representing the product of the second quadrature signal and the second orthogonal signal. In the embodiment shown in FIG. 2, the signal mixing means is illustratively shown as including signal mixers 20 and 25.

Signal mixer 20 forms a first mixed signal at its output which represents the product of quadrature signal I(t) and orthogonal signal X. The output of signal mixer 25 is a second mixed signal representing the product of quadrature signal Q(t) and orthogonal signal Y.

Figure 2A:
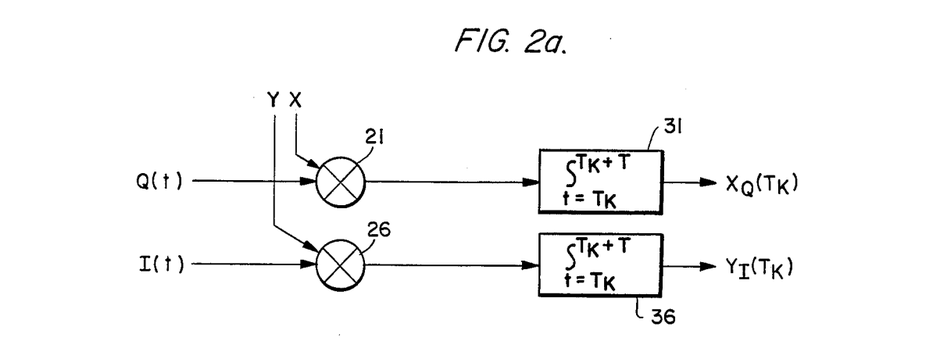
FIG. 2a shows a variation of the system in FIG. 2.

The differential sideband power could also be measured by mixing the quadrature signal Q(t) with orthogonal signal X and mixing quadrature signal I(t) with orthogonal signal Y. FIG. 2a shows such mixing by signal mixers 21 and 26.

Preferably, signal mixers 20, 21, 25 and 26 are conventional analog multipliers which form analog output signals proportional to the product of their input signals.

The signal processor of the present invention also comprises means connected to the signal mixing means for integrating the first mixed signal over a predetermined time interval to form a first time integral signal and for integrating the second signal over the same predetermined time interval to form a second time integral signal. In the preferred embodiment shown in FIG. 2, this integrating means is illustratively shown as including integrator circuits 30 and 35 connected to signal mixers 20 and 25, respectively. The integrator circuits integrate their input signals over a time interval $T_K$ to $T_K+T$. $T_K$ is the arbitrary starting time defined above and T is the radar signal processor sampling interval which is equal to the inverse of the sampling rate of the radar signal processor.

Integrators 30 and 35 are preferably resettable resistor-capacitor integrating operation amplifiers. The integrating means should be reset every sampling period, at the same time that signal generator 60 re-triggered.

The output of integrator 30 is a first integral signal, $$X_I(T_K) = \int_{T_K}^{T_K+T} I(t)W(t-T_K)\sin(2\pi f(t-T_K))dt, \text{ and}$$

the output of integrator 35 is the second integral signal, $$Y_Q(T_K) = \int_{T_K}^{T_K+T} Q(t)W(t-T_K)\cos(2\pi f(t-T_K))dt.$$

If the elements shown in FIG. 2a are used instead of the elements in FIG. 2, integrator 36 and integrator 31 would for signals $Y_I(T_K)$ and $X_Q(T_K)$, respectively:

$$Y_I(T_K) = \int_{T_K}^{T_K+T} I(t)W(t-T_K)\cos(2\pi f(t-T_K))dt; \text{ and}$$

$$X_Q(T_K) = \int_{T_K}^{T_K+T} Q(t)W(t-T_K)\sin(2\pi f(t-T_K))dt.$$

In accordance with the present invention, the radar signal processor also includes means for time-averaging the product of the first and second integral signals. As illustratively shown in FIG. 2, a sample multiplier 40 takes samples of the first and second integral signals, either $X_I(T_K)$ and $Y_Q(T_K)$ or $X_Q(T_K)$ and $Y_I(T_K)$, and multiplies them together. In the preferred embodiment, sample multiplier 40 includes sample and hold circuits (not shown) connected to the outputs of integrators 30 and 35, and an analog multiplier (not shown) to multiply the sampled signals together.

As further shown in the illustrative embodiment of FIG. 2, an averager circuit 50 takes the products from sample multiplier 40 and averages them over time. The result is an output signal which represents the differential sideband power for the energy received by the radar in the desired frequency window. This power equals the average over time of $X_I(T_K)Y_Q(T_K)$ or of $X_Q(T_K)Y_I(T_K)$. If the average of $X_Q(T_K)Y_I(T_K)$ is used, however the value for the determined differential sideband power will be negative. Preferably, averager circuit 50 is a conventional operational amplifier averaging circuit.

The time-averages of $X_I(T_K)Y_Q(T_K)$ and $X_Q(T_K)Y_I(T_K)$ would, if averaged for an infinite amount of time, exactly equal each other. In practice, however, the averages will differ slightly from each other due to such factors as clutter noise.

A more accurate determination of the differential sideband power for a certain frequency bin centered at frequency f and having a shape influenced by the weighting function $W(t-T_K)$ is the average of $X_I(T_K)Y_Q(T_K) - Y_I(T_K)X_Q(T_K)$ over time. Determining the power in this manner cancels out much of the clutter noise and enhances the signal-to-noise ratio of the power measurement.

Therefore, according to the present invention and to produce a more accurate determination of differential sideband power, the mixing means in the signal processor preferably also includes means for forming a third mixed signal representing the product of the first quadrature signal and the second orthogonal signal, and for forming a fourth mixed signal representing the product of the second quadrature signal and the first orthogonal signal. In the illustrated preferred embodiment, this means is shown as including signal mixers 21 and 26 in FIG. 2a in combination with signal mixers 20 and 25 of FIG. 20, signal mixers 21 and 26 produce third and fourth mixed signals, respectively.

The integrating means in the signal processor may then also includes means for integrating the third mixed signal over the predetermined time interval to form a third time integral signal and for integrating the fourth mixed signal over the predetermined time interval to form a fourth integral signal. An example of this means is shown as including integrators 31 and 36, which are identical to integrators 30 and 35 and which form the third time integral signal and the fourth time integral signal, respectively.

Finally, to produce a more accurate determination of differential sideband power the time-averaging means of the present invention may also include means for time-averaging the difference of the product of the first and second integral signals and the product of the third and fourth integral signals. In this preferred embodiment of the invention, sample multiplier 40 would form two products, $X_I(T_K)Y_Q(T_K)$ and $X_Q(T_K)Y_I(T_K)$, and averager 50 would average the difference of these products over time to determine the differential sideband power measurement for the selected frequency range.

The systems in FIGS. 2 and 2a have been described as being analog systems, but there is no need for such a limitation. If I(t) and Q(t) were digital signals, all the system elements would be digital elements and the system would operate in the same manner. For example, signal generator 60 can be a read only memory (ROM) containing a sequence of digital values for X and Y, signal mixers 20, 21, 25 and 26 can be digital multipliers, and integrators 30, 31, 35 and 36 can be digital integrators or accumulators. Similarly, multiplier circuit 40 and averager circuit 50 can contain digital multipliers and digital averagers.

Figure 3:
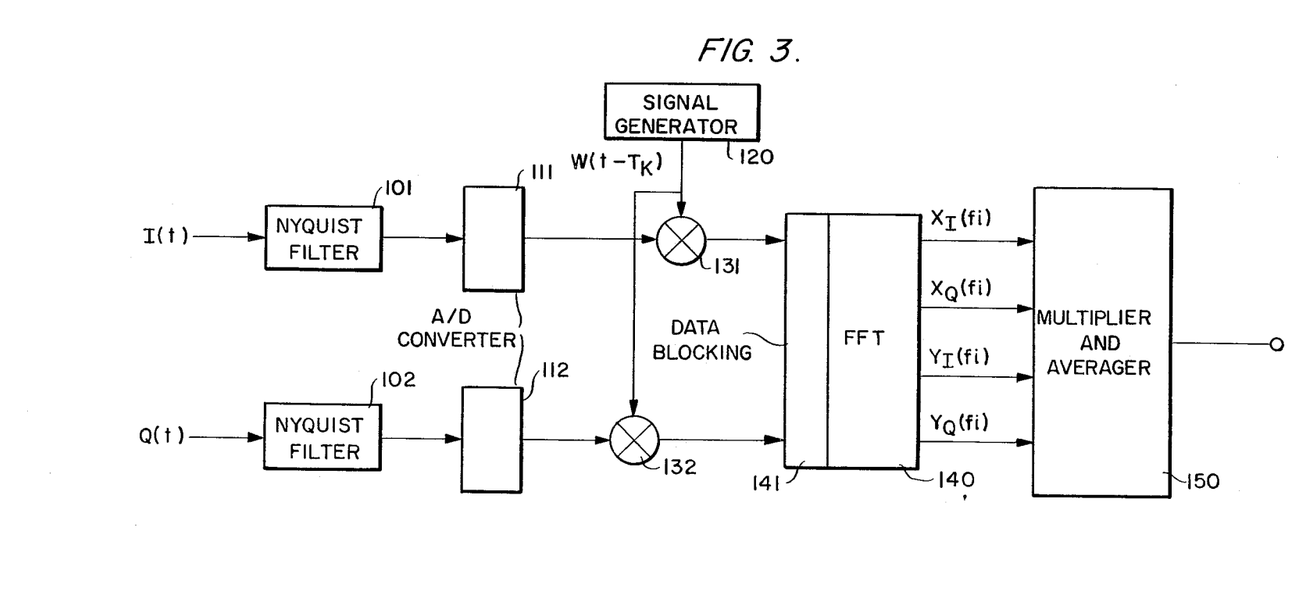
FIG. 3 shows a radar signal processor of this invention for determining the differential sideband power in several similarly shaped, equally spaced frequency windows.

One limitation of the systems in FIGS. 2 and 2a is that they measure differential sideband power in only one frequency window. FIG. 3 shows an embodiment of the present invention which measures the differential sideband power in similarly shaped frequency bins which are centered at equally spaced frequencies.

In the embodiment of the radar signal processor shown in FIG. 3, the I(t) and Q(t) quadrature signals from radar system 10 are produced in the manner described above. Each quadrature signal feeds a separate Nyquist filter 101 or 102 before being inputted to analog-to-digital converters 111 and 112. The Nyquist filters remove components of the I(t) and Q(t) input signals having frequencies greater than twice the analogto-digital converter's sampling frequency. Converters 111 and 112 provide means for converting the I(t) and Q(t) analog signals into digital signals.

Converter 111 connects to the output of Nyquist filter 101 to digitize I(t) and converter 112 connects to the output of filter 102 to digitize Q(t). The system instead could contain an analog multiplexer connected to the filtered I(t) and Q(t) signals to time-division multiplex those signals. In that case, only one analog-to-digital converter would be needed.

The signal processor system of this invention which is capable of determining the differential sideband power in similarly shaped, equally spaced windows also includes means for generating a weighting function $W(t-T_K$ to determine the shape of the frequency windows in which power is being measured. If only similarly shaped frequency windows are being investigated, then only one weighting function is required for all the windows. $T_K$, described earlier, is the arbitrary starting time.

In the exemplary embodiment shown in FIG. 3, this function generating means includes a signal generator 120 which outputs a sequence of digital values of $W(t-T_K$ Signal generator 120 is preferably a read only memory (ROM) which is synchronized with the analog-to-digital converter means.

The radar signal processor for this application also includes means for multiplying the quadrature signals I(t) and Q(t) times $W(t-T_K)$. As shown in the FIG. 3 embodiment, digital multipliers 131 and 132 multiply the values for the weighting function from signal generator 120 with the digital signals from analog-to-digital converters 111 and 112. Digital multipliers 131 and 132 are preferably conventional digital multiplier circuits.

The products from the multiplying means in this embodiment of the invention are inputted to a Fast Fourier Transformer (FFT) for forming FFT signals $X_I(f_i)$, $Y_I(f_i)$, $X_Q(f_i)$ and $Y_Q(f_i)$, for each frequency bin i having a center frequency $f_i$, $1 \leq i \leq n$. $X_I(f_i)$ equals the in-phase component of FFT (I, W); $Y_I(f_i)$ equals the quadrature component of FFT (I, W); $X_Q(f_i)$ equals the in phase component of FFT (Q, W); and $Y_Q(f_i)$ equals the quadrature component of FFT (Q, W).

In the preferred embodiment illustrated in FIG. 3, Fast Fourier Transformer 140 has a data blocking section 141 for storing the products from digital multipliers 131 and 132. Preferably, data blocking section 141 is a conventional memory large enough to store the number of products from digital multipliers 131 and 132 for the desired accuracy of Fast Fourier Transformer 140.

Fast Fourier Transformer 140 can either be a special purpose FFT circuit or a programmed processor. From the products stored in data blocking section 141, Fast Fourier Transformer 140 outputs 4n separate values, where n is the total number of frequency windows. For each frequency window i, Fast Fourier Transformer 140 outputs four values: $X_I(f_i)$, $Y_I(f_i)$, $X_Q(f_i)$ and $Y_Q(f_i)$.

In accordance with the present invention there is also preferably provided means for determining the differential sideband power for each frequency window i by time-averaging either $X_I(f_i)Y_Q(f_i)$ or $X_Q(f_i)Y_I(f_i)$ for each i. The embodiment in FIG. 3 illustratively shows this means as including multiplier and averager circuit 150. Circuit 150 includes a digital multiplier circuit which multiplies the values received from the Fast Fourier Transformer 140 and forms either $X_I(f_i)Y_Q(f_i)$ or $X_Q(f_i)Y_I(f_i)$. Multiplier and averaging circuit 150 also contains a time-averaging circuit which averages the product of the FFT signals over time. The average obtained is the differential sideband power for the frequency window i if the product formed by the multiplier is $X_I(f_i)Y_I(f_i)$ and is the negative of that power if the product formed is $X_Q(f_i)Y_I(f_i)$.

As stated above, the time-average of either product will be approximately the same, but they may differ slightly during certain time intervals due to clutter noise.

To mitigate the effect of the clutter noise, the means for determining the differential sideband power of an ith frequency window of a radar in the signal processing system of this invention may instead include means for time-averaging the equation $X_I(f_i)Y_Q(f_i) - X_Q(f_i)Y_I(f_i)$.

Figure 3A:
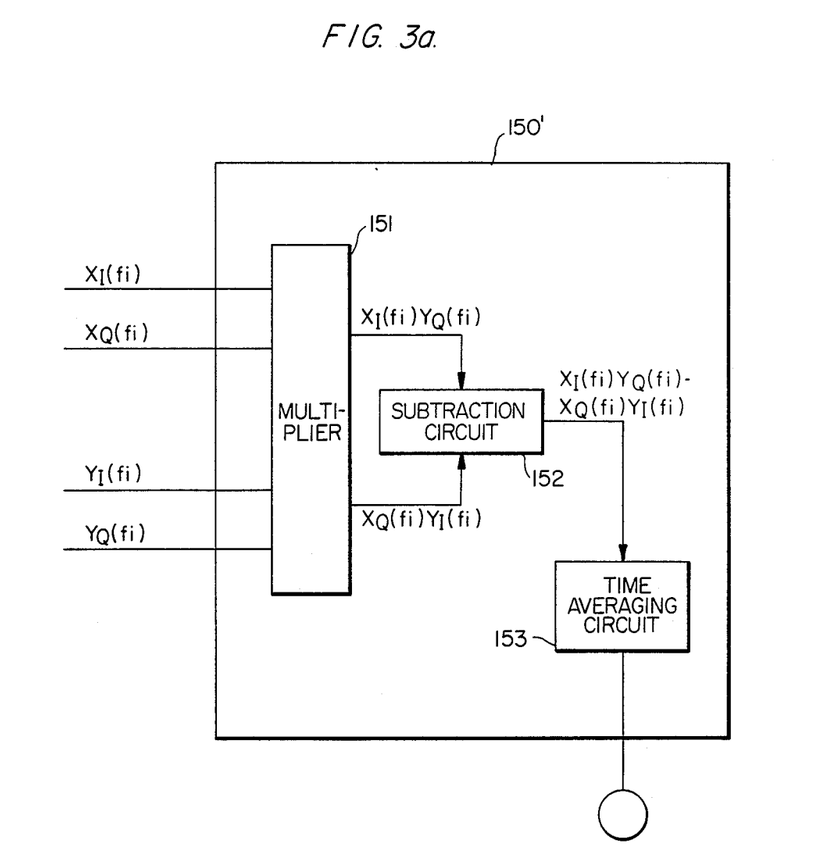
FIG. 3a shows a different multiplier and averager which can be used with the radar signal processor in FIG. 3.

In this case, circuit 150 of FIG. 3 is replaced by circuit 150' in FIG. 3a which includes digital multiplier circuits 151 to form both products $X_I(f_i)Y_Q(f_i)$ and $X_Q(f_i)Y_I(f_i)$ using the signals received from Fast Fourier Transformer 140. Circuit 150' also includes a subtraction circuit 152 determine the difference between those products and a time-averaging circuit 153 to average that difference over time. The output of this averaging circuit is a more accurate determination of the differential sideband power than is the output of a circuit which averages a single product because the subtraction of the two products cancels much of the clutter noise.

Figure 4:
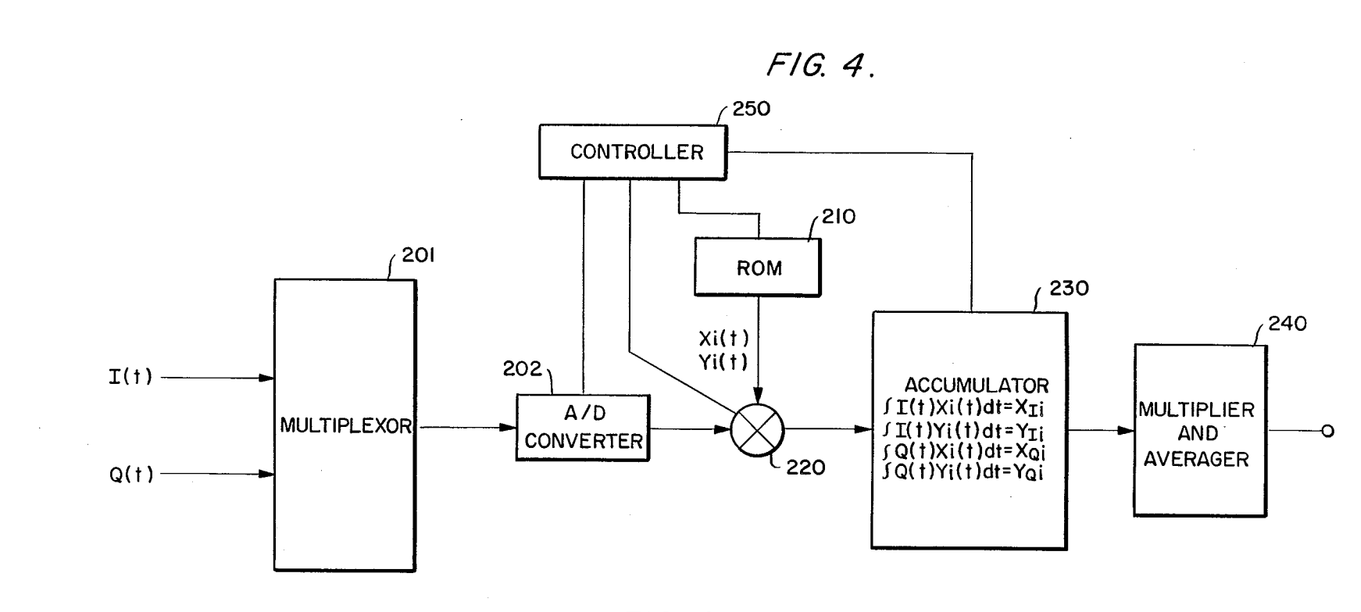
FIG. 4 shows a radar signal processor of this invention for determining the differential sideband power for any number of frequency windows in any number of range bins.

The example of the subject invention illustrated by FIG. 4 is more versatile than the circuit in FIG. 3 and can measure the differential sideband power in several dissimilarly shaped and nonuniformly spaced frequency bins and for several different radar range. In the signal processor shown in FIG. 4, quadrature signals I(t) and Q(t), because they contain signals from several range bins, are range-gated. I(t) and Q(t) feed an analog multiplexer 201 which alternately switches those quadrature signals to the input of an analog-to-digital converter 202 Analog-to-digital converter 202 converts the multiplexed I(t) and Q(t) signals into an output signal alternately containing digitized values for I(t) and Q(t). Digitized I(t) and Q(t) are produced for each sampling interval.

In accordance with a preferred embodiment there is included in the processor of the present invention means for storing n pairs of orthogonal sample sequences $$X_i(\tau_p) = W_i(\tau_p)\sin(2\pi f_i \tau_p),$$

$$Y_i(\tau_p) = W_i(\tau_p)\cos(2\pi f_i \tau_p),$$

for each frequency bin i, $1 \leq i \leq n$ (n=the number of frequency bins for each range) and for p, $1 \leq p \leq k_i$, where $k_i$ is the number of samples in the sequence for the ith frequency bin. $\tau_p = t - T_i$ ($T_i$ is an arbitrary starting time for frequency window i), $f_i$ is the center frequency of frequency window i, and $W_i(\tau_p)$ is the weighting function for frequency window i. As illustratively shown in FIG. 4, the storing means may include read only memory (ROM) 210 which stores the $X_i(\tau_p)$ and $Y_i(\tau_p)$ values.

The storing means could also include a random access memory (RAM) of a data processing system connected to the radar signal processor. Such an arrangement would allow the radar signal processor shown in FIG. 4 to adapt quickly to different radar input signals and to different frequency windows by changing the $X_i$ and $Y_i$ values stored in the memory.

The signal processor of this invention also preferably includes multiplying means for forming 4n product sequences by multiplying the digital values of I(t) by each $X_i(\tau_p)$ and $Y_i(\tau_p)$ value and by multiplying the digital values of Q(t) by each $X_i(\tau_p)$ and $Y_i(\tau_p)$ value. For each frequency window i, there are four product sequences:

a first ith product sequence equal to $IX_i(\tau_p)$;
a second ith product sequence equal to $QX_i(\tau_p)$;
a third ith product sequence equal to $IY_i(\tau_p)$; and
a fourth ith product sequence equal to $QY_i(\tau_p)$.

The values for $X_i(\tau_p)$ and $Y_i(\tau_p)$ correspond to the sampling intervals of the I(t) and Q(t) signals. In FIG. 4, this multiplying means is represented by multiplier 220 and preferably includes a conventional digital multiplier.

One of ordinary skill in the art would recognize that analog-to-digital converter 202, ROM 210 and multiplier 220 must be synchronized for proper operation. Such synchronization is provided by controller 250 which ensures that the digital values of I(t) and Q(t) arrive at multiplier 220 which correspond to the $X_i(\tau_p)$ and $Y_i(\tau_p)$ values arriving at multiplier 220 from ROM 210.

In accordance with the preferred embodiment shown in FIG. 4, the outputs of the multiplying means feed an accumulator which integrates each of the 4n product sequences over the time period $T_i$ to $T_i+\Delta T_i$, where $\Delta T_i$ is $k_i$ times the sampling interval. In this preferred embodiment, the accumulator contains 4n storage locations for each range bin. As illustrated in FIG. 4, an accumulator 230 is provided to perform this integration. Each storage location of accumulator 230 corresponding to frequency bin i is read out and is cleared to zero at time $T_i$. As each of the 4n products from mixing means 220 is inputted into accumulator 230, the product is added to the value stored in the corresponding storage location.

Accumulator 230 thus contains for each range bin n sets of four values: $X_{Ii}$, $Y_{Ii}$, $X_{Qi}$ and $Y_{Qi}$, corresponding to the sum of the products of the digitized I(t) and Q(t) values and the values of $X_i$ and $Y_i$ from ROM 210. Each value $X_{Ii}$ represents the integral of $I(t)X_i(t)dt$ from $T_i$ to $T_i+\Delta T_i$. Similarly, $Y_{Ii}$ represents the integral of $I(t)Y_i(t)dt$, $X_{Qi}$ represents the integral of $Q(t)X_i(t)dt$, and $Y_{Qi}$ represents the integral of $Q(t)Y_i(t)dt$, all over the same time interval.

Figure 4A:
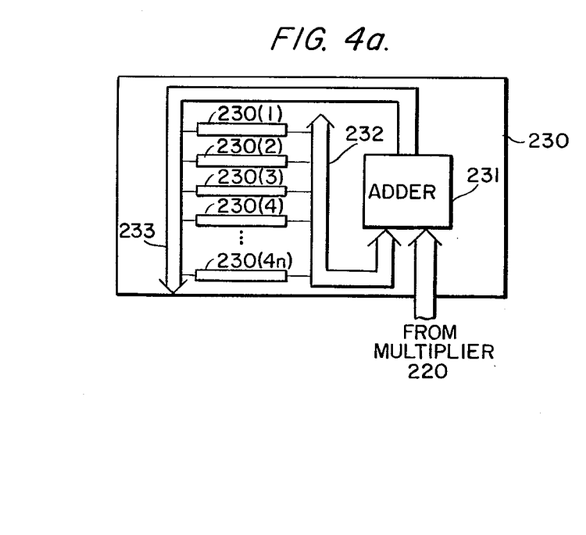
FIG. 4a shows some of the elements in the accumulator shown in FIG. 4.

In a preferred embodiment shown in FIG. 4a, accumulator 230 includes 4n separate storage registers 230(1) to 230(4n) and an adder 231 having two inputs. Data bus 232 directs the contents of the storage registers to one input of adder 231 and data bus 233 routes the output of adder 231 back to the storage registers. The other adder input is connected to the accumulator input from the multiplier 220. Controller 250 selects the storage registers in accumulator 230 corresponding to the products inputted from multiplier 220 and manages the outputting of the $X_{Ii}$, $Y_{Ii}$, $X_{Qi}$ and $Y_{Qi}$ signals.

In accordance with a preferred embodiment of the signal processing system of this invention, there is also provided means connected to the accumulator for deriving from the accumulator a first integral value equal to the integral of either the first or second product sequence, for deriving from the accumulator a second integral value equal to the integral of the third or fourth product sequence, and for time-averaging the product of the first and second integral values.

In the embodiment shown in FIG. 4, this means is illustratively represented by multiplier and averager circuit 240. Multiplier and averager circuit 240 derives from accumulator 230 either the $X_{Ii}$ and $Y_{Qi}$ values or the $Y_{Ii}$ and $X_{Qi}$ values. Circuit 240 then multiplies the derived values, averages the product over time and outputs that time-average as the differential sideband power of the ith frequency window. The elements of multiplier and averager circuit 240 are similar to the elements described above with regard to multiplier and averager circuit 150 shown in FIG. 3.

To improve the signal-to-noise ratio of the radar signal processor system discussed in the previous paragraphs by cancelling out more of the clutter noise, the deriving and time-averaging means can preferably include means for deriving from the accumulator a third integral value equal to the integral of either the first or second product sequence not used to form the first integral value, for deriving from the accumulator a fourth integral value equal to the integral of either the third or fourth product sequence not used to form the second integral value, and for time-averaging the difference of the product of the first and second integral values and the product of the third and fourth integral values.

As applied to the embodiment of FIG. 4, multiplier and averager circuit 240 derives from accumulator 230 values for $X_{Ii}$, $Y_{Ii}$, $X_{Qi}$ and $Y_{Qi}$. As circuit 240 received those values, it forms two products, $X_{Ii}Y_{Qi}$ and $Y_{Ii}X_{Qi}$. Multiplier and averager circuit 240 would then average the difference of those two products over time in the manner described with regard to multiplier and averager circuit 150 of FIG. 3.

Figure 5:
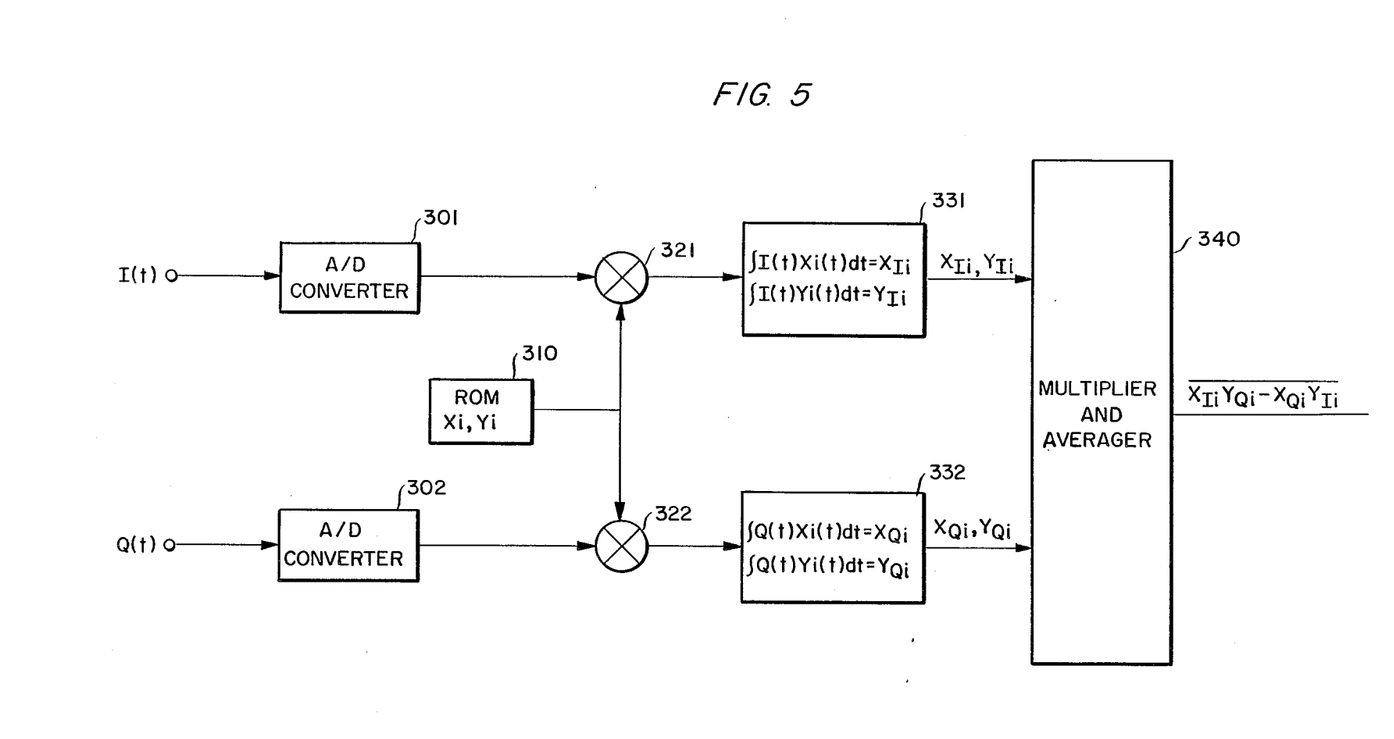
FIG. 5 shows an alternative to the circuit in FIG. 4.

FIG. 5 shows an alternate embodiment of the radar signal processor illustrated in FIG. 4. The quadrature signals I(t) and Q(t) feed analog-to-digital converters 301 and 302, respectively. The digitized signals from analog-to-digital converter 301 are inputted to multiplier 321 and the digitized signals from analog-to-digital converter 302 are inputted to multiplier 322. The other inputs to both those multipliers come from ROM 310 which contains the values of $X_i(\tau_p)$ and $Y_i(\tau_p)$ for each frequency window i where $1 \leq i \leq n$ (n=the number of frequency bins) and for p, $1 \leq p \leq k_i$ ($k_i$=the length of the sequence corresponding to the ith frequency bin). The 2n products from multiplier 321 are inputted to accumulator 331 which operates similar to accumulator 230 and forms 2n products $X_{Ii}$ and $Y_{Ii}$, where $$X_{Ii} = \int_{T_i}^{T_i + \Delta T_i} I(t)X_i(t)dt \text{ and}$$

$$Y_{Ii} = \int_{T_i}^{T_i + \Delta T_i} I(t)Y_i(t)dt.$$

The 2n products from multiplier 322 are inputted to accumulator 332 which is similar to accumulator 331 and which forms $X_{Qi}$ and $Y_{Qi}$ where $$X_{Qi} = \int_{T_i}^{T_i + \Delta T} Q(t)X_i(t)dt \text{ and}$$

$$Y_{Qi} = \int_{T_i}^{T_i + \Delta T_i} Q(t)Y_i(t)dt,$$

for each frequency window i.

The values from accumulators 331 and 332 feed multiplier and averager circuit 340 which, like circuit 240 in FIG. 4, finds the time-average of $X_{Ii}Y_{Qi}-X_{Qi}Y_{Ii}$.

The differential sideband power for frequency windows of signals from different radar range bins may be determined in accordance with the teachings of the present invention. The easiest way to do this would be to time-division-multiplex the I(t) and Q(t) signals from different radar ranges.

Figure 6:
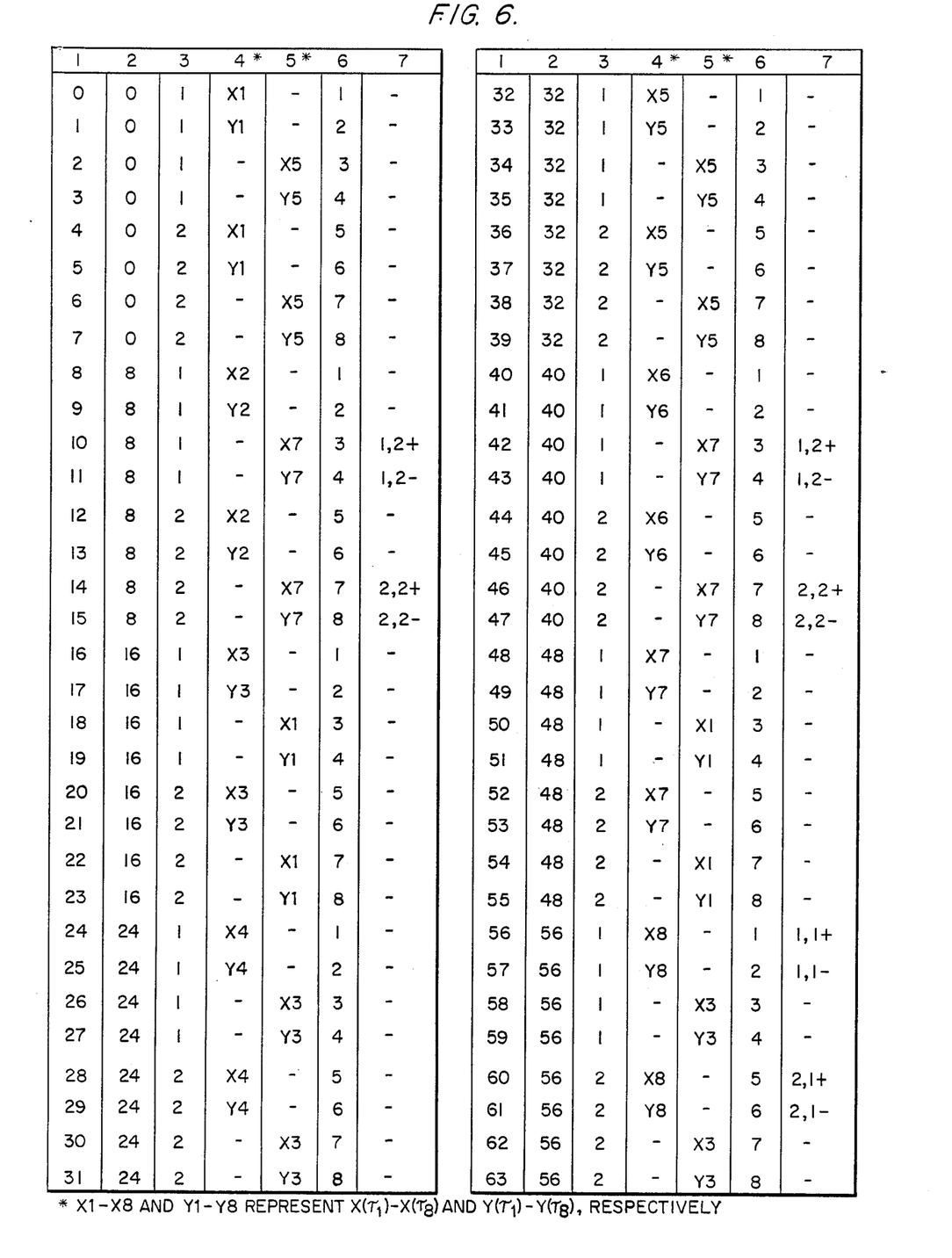
FIG. 6 contains a chart indicating the timing of the circuit in FIG. 5 used to determine the differential sideband power for two frequency windows and two range bins.

Use of the processor in FIG. 5 for determining the differential sideband power for different ranges is illustrated in the the table of FIG. 6. This table contains timing sequences of the radar signal processor in FIG. 5 processing signals from two range bins and for two frequency windows which are related to each other by a factor of 2. This 2:1 relationship of frequency windows, in which the lower frequency window has its center frequency and its width half of those of the higher frequency window, allows the outputs of the radar signal processor to be interleaved to make the processor more efficient. In FIG. 6:

Column 1 contains the number of the discrete times for the associated processing steps;

Column 2 indicates at which time the radar sample was taken;

Column 3 indicates which range bin is being processed;

Column 4 indicates the signals which are inputted to multipliers 321 and 322 from ROM 310 when the power in the lower frequency bin is being determined;

Column 5 indicates the signals which are inputted to multipliers 321 and 322 from ROM 310 when the power for the higher frequency bin is being determined;

Column 6 indicates which addresses of accumulators 331 and 332 are being used in the integration; and Column 7 indicates which integral is being outputted from the accumulator. The value being outputted is identified by the numbers in Column 7: the first number is the range bin; the second number is the frequency window; and the plus sign indicates that the $X_I Y_Q$ signal is being outputted while minus sign indicates that the $Y_I X_Q$ is being outputted.

As column 2 shows, every eight time periods, a new pair of radar signals I(t) and Q(t) are sampled. During the first four time periods one range is processed and during the following four time periods the second range is processed. Every two time periods the radar signal processor in FIG. 5 switches from determining the power in the first frequency window to determining the power in the second frequency window.

Because of the unique relationships of the frequency windows, the $X(\tau_1) - X(\tau_8)$ and $Y(\tau_1) - Y(\tau_8)$ values are used for determining the power in the lower as well as the higher frequency window. The processing of the differential power of the higher frequency window, however, uses only half of the X and Y values which the processing of the lower frequency window uses. It can also be seen, from column 7, that the terms used to determine the differential power in the high frequency window are available twice as often as are the signals for processing the power in the lower frequency window.

The table in FIG. 6 demonstrates the simplification provided by the teaching of the present invention in processing the signals from a radar system to determine the differential sideband power in the desired frequency windows.

It will be apparent to those skilled in the art that modifications and variations can be made in the radar signal processing methods and apparatus of this invention. The invention in its broader aspects is, therefore, not limited to the specific details, representative methods and apparatus, and illustrative examples shown and described. Accordingly, departure may be made from such details without departing from the spirit or scope of applicant's general inventive concept.

What is claimed is:

1. A method of determining the differential sideband power of energy received in a desired frequency window by a radar system, that determination of power being useful in detecting non-oscillatory movement of an object within the range of said radar system, said method comprising the steps of:
   (a) transmitting radar energy;
   (b) receiving reflections of said transmitted radar energy;
   (c) heterodyning a sample of said transmitted energy and said received reflections to produce first and second quadrature signals;
   (d) generating first and second orthogonal signals;
   (e) integrating the product of said first quadrature signal and said first orthogonal signal over a predetermined time interval to produce a first integral signal;
   (f) integrating the product of a second one of said quadrature signals and a second one of said orthogonal signals over said predetermined time interval to produce a second integral signal; and
   (g) time-averaging the product of said first and second integral signals.

2. A method according to claim 1 wherein said step of generating first and second orthogonal signals includes the step of generating a signal W(t)·sin (2πft) as said first orthogonal signal and a signal W(t)·cos (2πft) as said second orthogonal signal, where
   f is the center frequency of said desired frequency window, and
   W(t) is a weighting function which controls the shape of said desired frequency window.

3. A method according to claim 2 wherein W(t) is a constant.

4. A method according to claim 1 wherein said steps of integrating each include the step of performing a Fast Fourier Transform.

5. A method of claim 1 wherein the steps of generating orthogonal signals, integrating and time-averaging are repeated for different frequency windows.

6. A radar signal processor for determining the differential sideband power of energy received in a frequency window by a radar system which produces first and second quadrature signals at least in part from said received energy, said radar signal processor comprising:
   (a) means for generating first and second orthogonal signals;
   (b) signal mixing means for forming a first mixed signal representing the product of said first quadrature signal and said first orthogonal signal and for forming a second mixed signal representing the product of said second quadrature signal and said second orthogonal signal;
   (c) means connected to said signal mixing means for integrating said first mixed signal over a predetermined time interval to form a first integral signal and for integrating said second mixed signal over said predetermined time interval to form a second integral signal; and
   (d) means for time-averaging the product of said first and second integral signals.

7. A radar signal processor for determining the differential sideband power of energy received in a frequency window by a radar system which produces first and second quadrature signals at least in part from said received energy, said radar signal processing system comprising:

(a) means for generating first and second orthogonal signals $$X = W(t-T_K) \sin(2\pi f(t-T_K))$$

and $$Y = W(t-T_K) \cos(2\pi f(t-T_K)),$$

respectively, where f is the center frequency of said frequency window;

$T_K$ is an arbitrary starting time, and $W(t-T_K)$ is a weighting function controlling the shape of said frequency window;

(b) signal mixing means for forming a first mixed signal representing the product of said first quadrature signal and said first orthogonal signal and for forming a second mixed signal representing the product of said second quadrature signal and said second orthogonal signal;

(c) means connected to said signal mixing means for integrating said first mixed signal over a predetermined time interval to form a first time integral signal and for integrating said second mixed signal over said predetermined time interval to form a second time integral signal; and (d) means for time-averaging the product of said first and second integral signals.

8. A signal processing system for determining the differential sideband power of energy received in n similarly shaped and equally spaced frequency windows by a radar system which produces two quadrature signals I and Q at least in part from said received energy, said radar signal processor comprising:

(a) means for generating a weighting function $W(t-T_K)$, where $T_K$ is an arbitrary starting time;

(b) means for multiplying said quadrature signals I and Q times $W(t-T_K)$;

(c) a Fast Fourier Transformer connected to the output of said multiplying means for forming signals $X_I(f_i)$ equal to the in-phase component of FFT (I, W), $Y_I(f_i)$ equal to the quadrature component of FFT (I, W), $X_Q(f_i)$ equal to the in-phase component of FFT (Q, W), and $Y_Q(f_i)$ equal to the quadrature component of FFT (Q, W) for each frequency bin i having a center frequency $f_i$, $1 \leq i \leq n$; and (d) means for determining the differential sideband power for each frequency window i by time-averaging either $X_I(f_i)Y_Q(f_i)$ or $X_Q(f_i)Y_I(f_i)$ for each i.

9. A signal processing system for determining the differential sideband power of energy received in n similarly shaped and equally spaced frequency windows by a radar system which produces two quadrature signals I and Q at least in part from said received energy, said radar signal processor comprising:

(a) means for generating a weighting function $W(t-T_K)$, where $T_K$ is an arbitrary starting time;

(b) means for multiplying said quadrature signals I and Q times $W(t-T_K)$;

(c) a Fast Fourier Transformer connected to the output of said multiplying means for forming signals $X_I(f_i)$ equal to the in-phase component of FFT (I, W), $Y_I(f_i)$ equal to the quadrature component of FFT (I, W), $X_Q(f_i)$ equal to the in-phase component of FFT (Q, W), and $Y_Q(f_i)$ equal to the quadrature component of FFT (Q, for each frequency bin i having a center frequency $f_i$, $1 \leq i \leq n$;

(d) means for determining the differential sideband power for each frequency window i by time-averaging $X_I(f_i)Y_Q(f_i) - X_Q(f_i)Y_I(f_i)$ for each i.

10. The signal processing system in claim 8 or 9 further including analog-to-digital converter means connected between said I and Q quadrature signals and said multiplying means.

11. A signal processor for determining the differential sideband power of energy received in n frequency windows by a radar system which, for each sampling interval, produces quadrature signals I and Q at least in part from said received energy, said radar signal processing system comprising:

(a) means for storing n pairs of orthogonal sample sequences $$X_i(\tau_p) = W_i(\tau_p) \sin(2\pi f_i \tau_p) \text{ and}$$

$$Y_i(\tau_p) = W_i(\tau_p) \cos(2\pi f_i \tau_p),$$

for each frequency bin $i$, $1 \leq i \leq n$, and for $p$, $1 \leq p \leq k_i$, where $k_i$ is the number of samples in the sequence for the ith frequency window, $\tau_p = t - T_i$, $T_i$ being an arbitrary starting time for frequency window i, $f_i$ = the center frequency of frequency window i, and $W_i(\tau_p)$ = the weighting function for frequency window i;

(b) multiplying means for forming 4n product sequences consisting of the following four product sequences for each frequency window i;

a first ith product sequence equal to values of I times values of $X_i(\tau_p)$, a second ith product sequence equal to values of Q times values of $X_i(\tau_p)$, a third ith product sequence equal to values of I times values of $Y_i(\tau_p)$, and a fourth ith product sequence equal to values of Q times values of $Y_i(\tau_p)$, the values of $X_i(\tau_p)$ and $Y_i(\tau_p)$ corresponding to the sampling intervals of the I and Q signals;

(c) an accumulator receiving said 4n product sequences from said multiplying means and integrating each of said product sequences over a time period from $T_i$ to $T_i + \Delta T_i$, where $\Delta T_i$ is $k_i$ times the sampling interval; and (d) means connected to said accumulator for deriving from the output of said accumulator a first integral value equal to the integral of one of said first or second ith product sequences, deriving from the output of said accumulator a second value equal to the integral of one of said third or fourth ith product sequences, and for time-averaging the product of said first and second integral values for each i.

12. A signal processor for determining the differential sideband power of energy received in n frequency windows by a radar system which, for each sampling interval, produces quadrature signals I and Q at least in part from said received energy, said radar signal processing system comprising:

(a) means for storing n pairs of orthogonal sample sequences $$X_i(\tau_p) = W_i(\tau_p) \sin(2\pi f_i \tau_p) \text{ and}$$

$$Y_i(\tau_p) = W_i(\tau_p) \cos(2\pi f_i \tau_p),$$

for each frequency window i, $1 \leq i \leq n$, and for p, $1 \leq p \leq k_i$, where $k_i$ is the number of samples in the sequence for the ith frequency window, $\tau_p = t - T_i$, $T_i$ being an arbitrary starting time for frequency window i, $f_i$ = the center frequency of frequency window i, and $W_i(\tau_p)$ = the weighting function for frequency window i;

(b) multiplying means for forming 4n product sequences consisting of the following four product sequences for each frequency window i;

a first ith product sequence equal to values of I times values of $X_i(\tau_p)$, a second ith product sequence equal to values of Q times values of $X_i(\tau_p)$, a third ith product sequence equal to values of I times values of $Y_i(\tau_p)$, and a fourth ith product sequence equal to values of Q times values of $Y_i(\tau_p)$, the values of $X_i(\tau_p)$ and $Y_i(\tau_p)$ corresponding to the sampling intervals of the I and Q signals;

(c) an accumulator receiving said 4n product sequences from said multiplying means and integrating each of said product sequences over a time period from $T_i$ to $T_i + \Delta T_i$, where $\Delta T_i$ is $k_i$ times the sampling interval; and (d) means connected to said accumulator for deriving from said accumulator a first integral value equal to the integral of said first ith product sequence, deriving from said accumulator a second integral value equal to the integral of said second ith product sequence, for deriving from said accumulator a third integral value equal to the integral of said third ith product sequence, for deriving from said accumulator a fourth integral value equal to the integral of said fourth ith product sequence, for time-averaging the difference of the products of said first and second integral values and the product of said third and fourth integral values.

13. The signal processor in claim 11 or 12 wherein said accumulator includes 4n storage locations corresponding to each of said 4n product sequences from said multiplying means and wherein each of said product sequences from said multiplying means is added to the values in the corresponding storage location.

14. The signal processor in claim 13 further including at least one analog-to-digital converter to convert said I and Q signals to digital values to be inputted to said multiplying means.

15. The signal processor in claim 13 wherein said I and Q signals are range-gated, wherein said accumulator contains 4n storage locations for each range bin in which the differential sideband power measurement is desired and wherein said deriving and averaging means derives integral values and time-averages for each frequency window in each range bin.

* * * * *